Dec. 25, 1956    T. STIEBEL    2,775,259
WATER MIXING UNIT
Filed Nov. 22, 1950    5 Sheets-Sheet 1

INVENTOR
THEODOR STIEBEL
BY
ATTORNEY

Dec. 25, 1956  T. STIEBEL  2,775,259
WATER MIXING UNIT
Filed Nov. 22, 1950  5 Sheets-Sheet 2

INVENTOR
THEODOR STIEBEL
BY
ATTORNEY

Dec. 25, 1956  T. STIEBEL  2,775,259
WATER MIXING UNIT
Filed Nov. 22, 1950  5 Sheets-Sheet 3

INVENTOR
THEODOR STIEBEL
BY
ATTORNEY

Dec. 25, 1956 — T. STIEBEL — 2,775,259
WATER MIXING UNIT
Filed Nov. 22, 1950 — 5 Sheets-Sheet 4
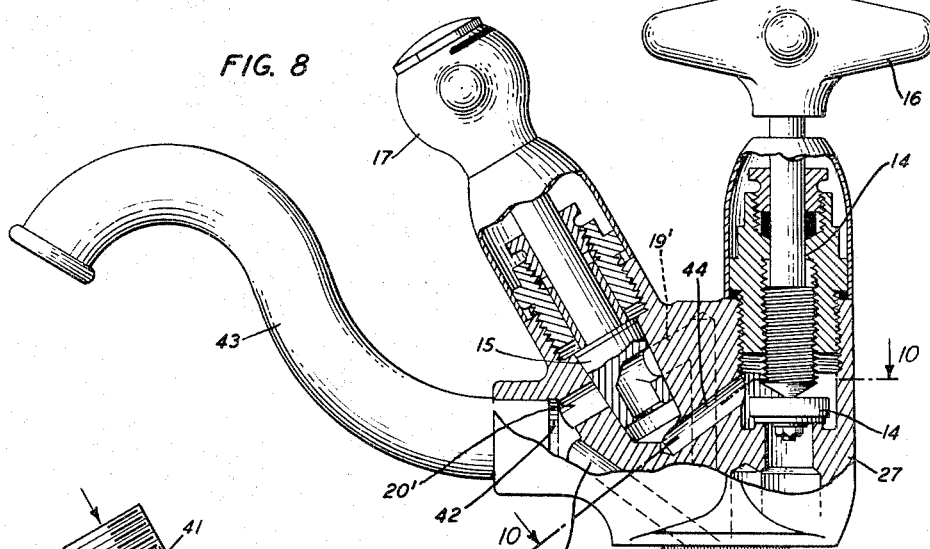
FIG. 8
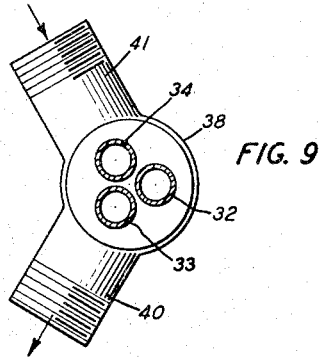
FIG. 9
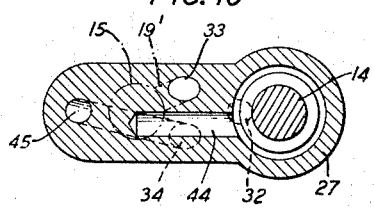
FIG. 10
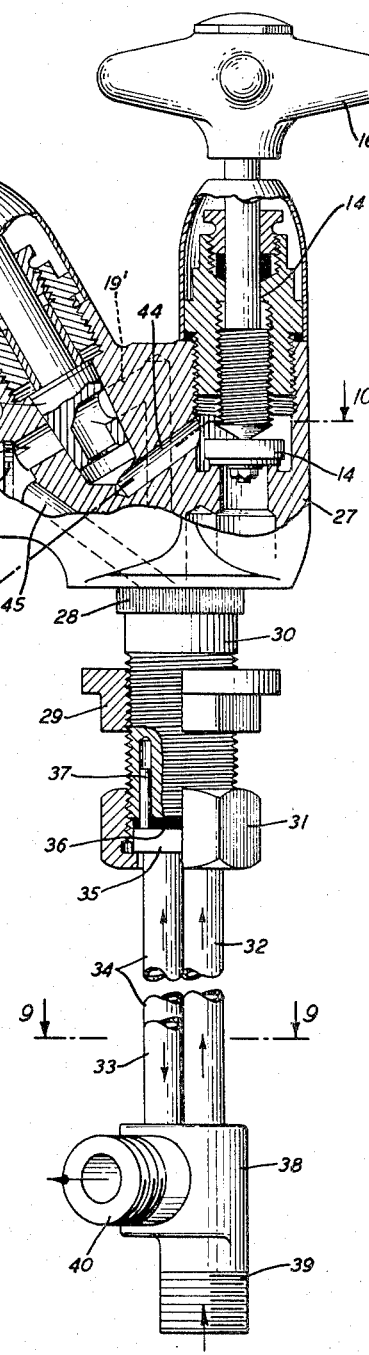
INVENTOR
THEODOR STIEBEL
BY
ATTORNEY Dec. 25, 1956 T. STIEBEL 2,775,259
WATER MIXING UNIT
Filed Nov. 22, 1950 5 Sheets-Sheet 5
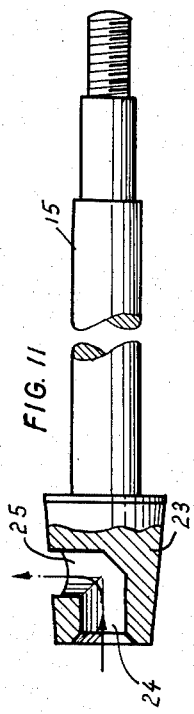
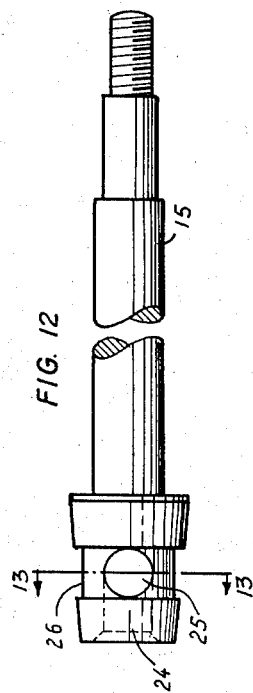
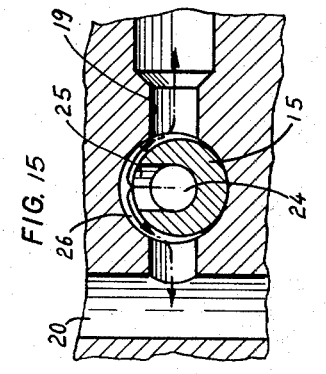
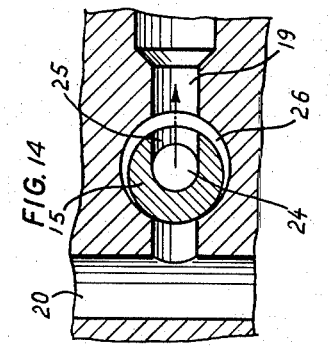
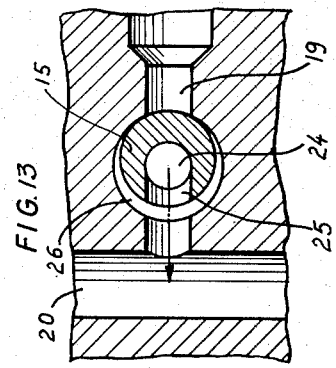
INVENTOR
THEODOR STIEBEL
BY
ATTORNEY

United States Patent Office 2,775,259
Patented Dec. 25, 1956

2,775,259
WATER MIXING UNIT
Theodor Stiebel, Holzminden, Germany

Application November 22, 1950, Serial No. 197,116

11 Claims. (Cl. 137—599.1)

This invention relates to a hot water mixing unit for water supply systems including a hot water reservoir or tank.

Water mixing units having a closure valve for the cold water, a closure valve for the hot water, and still a third closure valve for the mixed water, are known. The operation of these mixing units is cumbersome in that three, or two, operating handles must be provided and operation with one hand is not possible. Furthermore, hot water mixing units with but a single handle are known, but these do not permit of ready and independent control of each the temperature and the volume of the water, which controls in such units are so coupled to each other that with increasing volume of water the temperature is decreased, and vice versa. Also the operation of the single handle of such devices is not a natural motion as it involves lifting the handle for one control, say of the temperature, and a rotation of the handle for the other control, for example of the volume.

An object of the invention is to provide hot water mixing units in which the operation is readily performed by one hand.

A further object of the invention is to provide a hot water mixing unit operable by a rotary motion to control each the quantity and the temperature of the water output.

A further object of the invention is to provide a mixing unit in which the volume of the output water and the temperature of such water are controllable independently of each other.

Still a further object of the invention is to provide a mixing unit in which the independent control of each the temperature and the volume of the water output may be effected before, as well as during, the outflow of water.

I accomplish the foregoing, as well as other, objects by providing my mixing unit with two operating handles only, one handle for the water closure valve and the other for a mixing cock or plug. The two handles are so closely positioned adjacent each other that both are operable with one hand, and even simultaneously, one with the palm and the other with the fingers of the same hand.

The specific arrangement of the mixing unit of my invention depends to some measure on whether the water in the tank is under pressure above atmospheric or is at atmospheric pressure, that is, on whether the water system is "high pressure" or "low pressure." In the mixing unit for low pressure, the arrangement of the rotatable closure valve and the rotatable mixing cock is such that the water released on opening the closure valve flows, by way of the mixing cock, in part directly to the mixing chamber and the remainder to the hot water tank displacing hot water which flows to the mixing chamber; the magnitude of the part and the remainder depending on the rotated position of the mixing cock. In the herein illustrative units of this type, the closure valve is in the water ways ahead of the mixing plug. Mixing units for high pressure water systems, in which both the cold and hot water are supplied to the mixing plug, and in which the closure valve may be in the water ways behind the mixing plug as well as before it, are disclosed and claimed in my application Serial Number 488,243, filed February 15, 1955, divided out of the instant application.

The foregoing objects and features of my invention may be more readily understood from the following description when read with reference to the accompanying drawings, in which:

Figure 8 is a side view, partially in section, of a second illustrative embodiment of my low pressure unit;

Figure 9 is a section along line 9—9 of Figure 8;

Figure 10 is a section along line 10—10 of Figure 8;

Figure 11 shows the mixing plug in elevation, partially in section;

Figure 12 shows the plug in elevation rotated about its axis a quarter turn from the position of Figure 11;

Figure 13 is a schematic diagram showing the plug in section along line 13—13 of Figure 12 and in its relation to the bores in the cold water position of the low pressure mixing unit; and Figures 14 and 15 are similar to Figure 13 but show, respectively, the hot water position and the intermediate position where equal volumes of hot and cold water are mixed.

Figure 1:
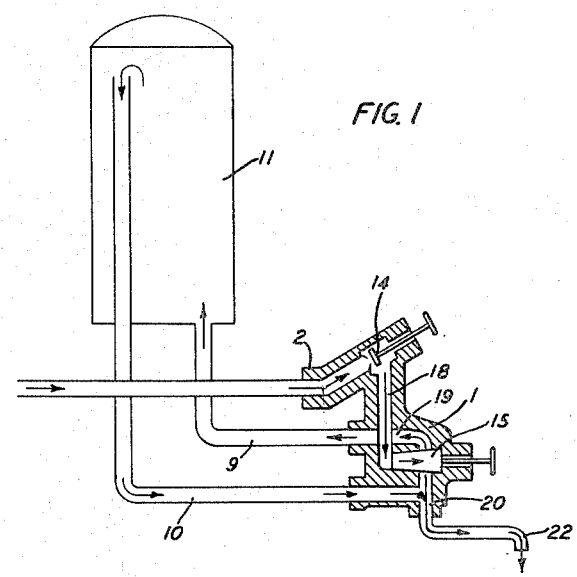
Figure 1 is an elevational schematic drawing showing the water ways for an illustrative embodiment of my low pressure hot water mixing unit.
Figures 2, 3:
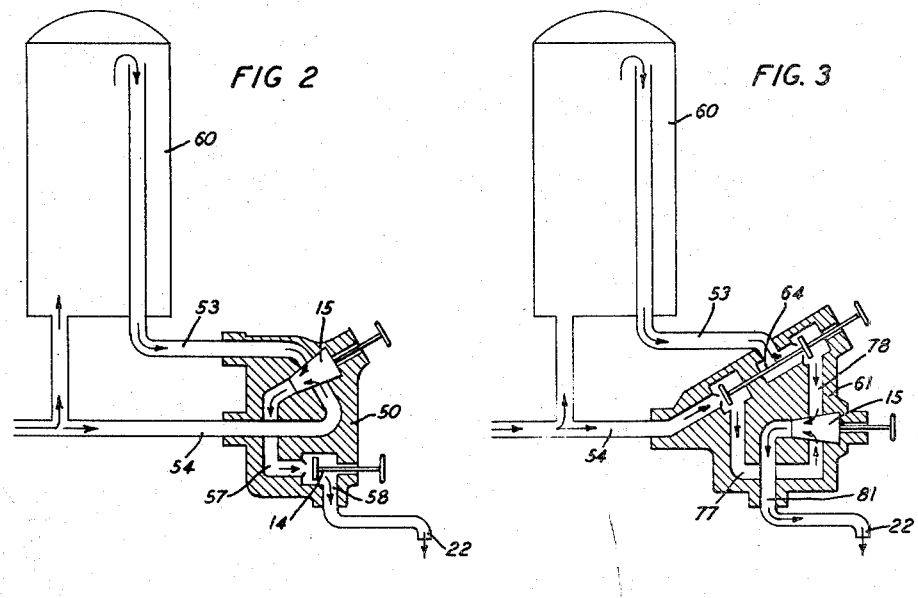
Figure 2 is an elevational schematic drawing showing the water ways for a first illustrative embodiment of my hot water high pressure mixing unit.
Figure 3 is an elevational schematic drawing showing the water ways for a second illustrative embodiment of my hot water high pressure mixing unit.
Figure 4:
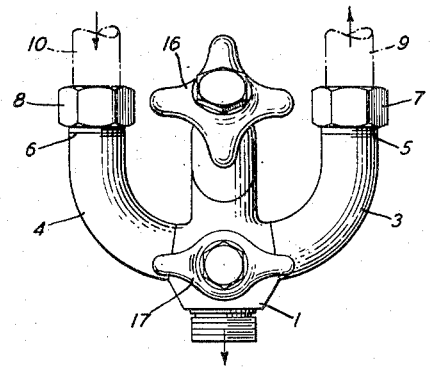
Figure 4 is a front view of an illustrative embodiment of my low pressure hot water mixing unit.
Figure 5:
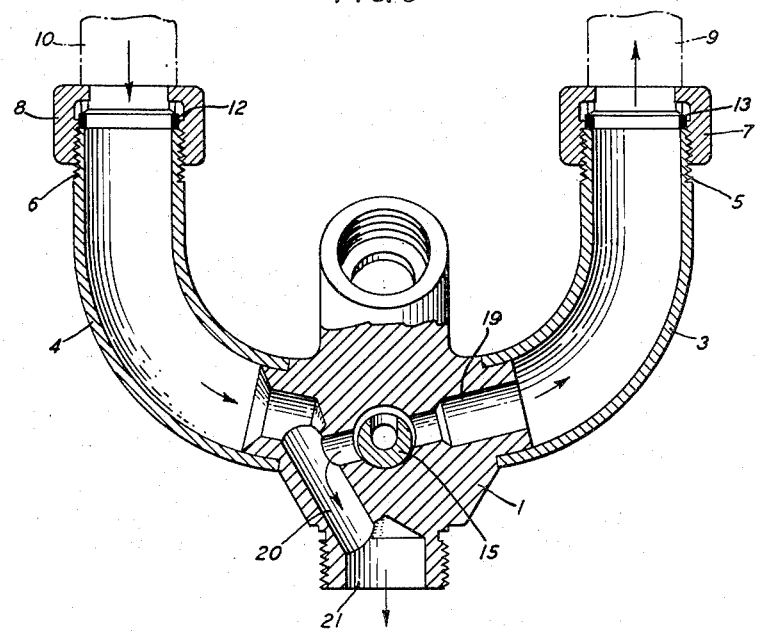
Figure 5 is a vertical section through the embodiment of Figure 4.
Figure 6:
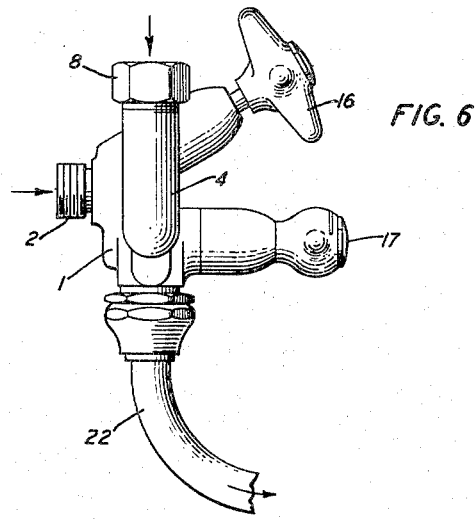
Figure 6 is a side view of the embodiment of Figure 4.
Figure 7:
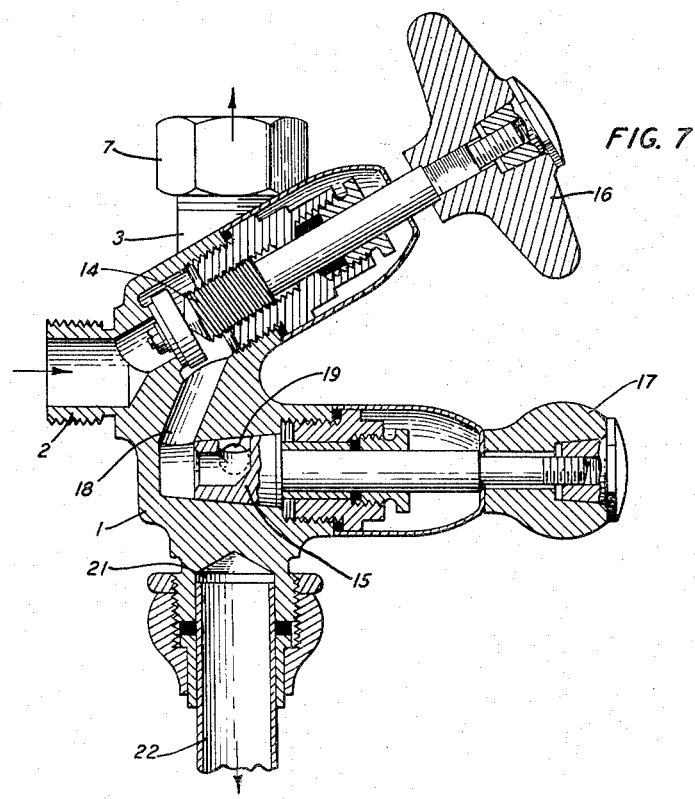
Figure 7 is a vertical section through Figure 6.

The body 1 of my low pressure hot water mixing unit (Figures 4 to 7) is a die casting having the cold water connecting tap 2 at the rear thereof. Connecting elbows 3 and 4 are soldered to the respective sides of the body, and are threaded at their respective free ends, 5 and 6, and provided with lock nuts, 7 and 8, for locking thereto the supply pipe 9 to, and the return pipe 10 from, the hot water tank 11 through the packing rings 12 and 13. Into the body 1 are fitted water closure valve 14 and a mixing plug or tap 15, provided respectively with handles 16 and 17. A bore 18 connects the bore into which the valve 14 is fitted with that into which the mixing tap 15 is fitted. A bore 19 further connects the mixing tap bore with the elbow 3, and a bore 20 connects the mixing tap bore with the mixing chamber 21. The tiltable pipe arm 22 is connected to the mixing chamber, and from such pipe the mixed water flows out of the unit to the point of consumption, which may be in the immediate vicinity of the unit or at a more remote point. As shown in detail in Figure 11, the mixing tap 15 at its non-handle end region carries a tapered cone 23 having a bore 24 extending axially from the bottom of the cone into the cone and communicating with the bore 25 extending radially from the bore 24 at about the middle region of the cone 23 and terminating in a single port in a recessed portion of the conical wall of the cone 23. The recessing 26 in the vicinity of the port of the bore 25 is shown in Figure 12 in elevation and in section in Figures 13 to 15. Recessing 26 is of a height at least equal to the diameter of the bore 25 and is deepest at the port of the bore 25, tapering in depth circumferentially about the cone in excess of 180 degrees, being preferably of the order of 200 to 250 degrees, as shown in Figures 13 to 15. This recessing also avoids water hammer in that the flow of water in any of the connecting bores is not shut off suddenly but is shut off gradually.

The operation of the mixing unit of Figures 4 to 7, and of the system of Figure 1 incorporating such unit, is as follows: Cold water flows from the main through pipe 2 to closure valve 14. When the latter is opened by turning the handle 16, water flows by way of bore 18 to the mixing tap 15. The mixing tap, depending on the position of its radial bore 25, directs the admitted water as shown in Figures 13 to 15, wherein the flow for low or atmospheric pressure systems is indicated by the arrows. As shown in Figure 13, with the mixing tap positioned at one extreme of its range, all the released water flows through the bore 20 into the mixing chamber, that is, cold water is emitted from the arm 22. With the mixing tap, or rather its radial bore 25, at the other extreme of its range, as shown in Figure 14, all the released water flows through the bore 19 into the hot water tank 11, causing an equal volume of hot water to flow from the tank through the return pipe 10 and the bore 20 into the mixing chamber, that is, water at the hottest temperature available from the unit, is emitted. At positions of the mixing tap in which the radial bore 25 occupies a position intermediate the extremes, of which in Figure 15 the central intermediate position is depicted, the mixing tap divides the water into two portions. One portion of the water now flows from the bores of the cone directly through bore 20 to the mixing chamber 21. The other portion flows from the radial bore of the cone through the recessed portion of the cone and the bore 19 into elbow 3 and from the elbow through the tank supply pipe 9 into the hot water tank 11. From the tank there will then flow hot water of substantially this same volume of this other portion of cold water through the tank return pipe 10, elbow 4 and bore 20 to the mixing chamber. Mixed water of a selected intermediate temperature thus flows freely from the mixing chamber through the arm 22. By operating the closure valve 14, the quantity of water released is controlled while leaving unaffected the mixing proportions as adjusted, and hence the temperature, of the mixed water emitted. On actuation of the mixing tap 15, the temperature of the mixed water emitted is controlled in that either a larger portion of the cold water is caused to flow directly to the mixing chamber, so that only the smaller portion is directed to and through the hot water tank, or vice versa.

In the second illustrative embodiment of my mixing unit for low pressure systems, I build the same directly into a wash basin with the outlet of the mixing unit in the form of a single faucet. In the first illustrative embodiment just described, my mixing unit is shown in a form which may act as a pure transmitting unit, in proximity to or more or less remote from a hot water tank. In such first embodiment, the cold water connection is preferably at the rear of the unit, with the water supply and return pipes to and from the tank to the respective sides of the unit. In my second illustrative embodiment the cold water supply is preferably below the basin and to the bottom of the unit, as preferably are the tank supply and return pipes; all three pipes being supported in a common fitting. My second illustrative embodiment is shown in Figures 8 to 12, and with reference to this and all other embodiments to be described, like reference characters define parts of these embodiments which are the same as in the embodiment of the Figures 4 to 7.

The main body 27 of this embodiment of my mixing unit has a serrated projection 28 at its lower surface by which it is adapted to be held in the wash basin (not shown) and to prevent rotation of the unit with respect thereto by tightening up on nut 29 which is threaded on the pipe connector 30 fitted to the projection 28. Pipe connector 30 is threaded externally its entire length and carries a lower lock nut 31 screwable thereon. The cold water supply pipe 32, the tank supply pipe 33, and the tank return pipe 34, are connected to connector 30 by means of the nut 31 which tightens the head piece 35, in which the three pipes terminate, through the packing 36 to the connector 30. Since the pipes 32, 33 and 34 are appropriately continued by registering bores through the connector 30, a pin 37 is provided to prevent rotation of the parts from the registering position while tightening up on nut 31. The lower ends of pipes 32, 33 and 34 are connected to a body member 38 having a cold water tap 39 at its lower surface and lateral connecting taps 40 and 41 connecting the tank supply pipe 33, respectively the tank return pipe 34, to the tank 11. The mixing chamber 42 is connected to the faucet 43.

Cold water flows from its supply pipe 32 to the closure valve 14, and, depending on the opening of valve 14 from its seat, a quantity of cold water flows through the bore 44 to the mixing plug 15, which directs and divides the cold water as above described with reference to Figures 22 to 24. Some, depending on the degree of rotation of plug 15 to positions intermediate the extremes, passes through bore 20' directly to the mixing chamber 42, and the remainder through the connecting bore 19' into the tank supply pipe 33 and tap 40 to the hot water tank, from which a corresponding amount of hot water will then flow from the tank 11 through tap 41, return pipe 34, and connecting bore 45 to the mixing chamber.

It will be noted that in all the embodiments, assuming that the mixing plug has, in a prior use of the particular unit, been set so that the emitted mixed water is of the desired temperature, the position of the mixing plug need not be disturbed. When the closure valve is again opened, the temperature of the emitted water will be the same, irrespective of the degree of opening of the closure valve, as in the prior use of the unit. Thus the physician, the hairdresser, or other user of the unit, will not run the risks and discomforts of an unsuitable temperature, for example, too high a temperature which might cause scalding. Furthermore, in all embodiments, the two controls are independent of each other, and this is so whether the closure valve or the mixing plug precedes the other in the direction of water flow and whether the closure valve and the mixing plug are simultaneously operated or at different times and in either sequence. Both are actuated by a rotational motion which is in the same direction for low to high, volume in the case of the closure valve and temperature in the case of the mixing plug. Also, since the handles of each of the closure valve and the mixing plug of each embodiment are so close to each other, the valve, for example, may be operated by the fingers of the hand while the palm of the same hand rests on, and rotates if desired, the mixing plug.

What I claim is:

1. A water mixing unit comprising a source of hot water, a body, a water closure valve in the body, a source of cold water connected to the closure valve, a cavity having a circular cross section, a fitted rotatable plug filling the cavity, an axial bore through an end region of the plug, a radial bore through an intermediate portion of the plug connecting to the axial bore within the plug and terminating in one port in the curved surface of the plug, the curved surface of the plug being circumferentially recessed to both sides of the port, a first connection from the closure valve to the cavity registering with and opening into the axial bore of the plug, a second connection from the source of hot water to the cavity registering with the circumferentially recessed curved surface region of the plug, a mixing chamber, a third connection from the mixing chamber to the cavity registering with the circumferentially recessed curved surface region of the plug, and a fourth connection from the hot water source to the mixing chamber, whereby the water from the cold water source released on opening the closure valve flows through the first connection to the plug and is divided by the plug into two portions depending on the setting of the plug, one portion flowing directly through the third connection to the mixing chamber and the other portion flowing through the second connection, the hot water source and the fourth connection to the mixing chamber.

2. A water mixing unit for obtaining water at one of a range of temperatures comprising a source of hot water, a body, a water closure rotatable valve in the body, a source of cold water connected to the body and ot the closure valve, an elongated cavity of circular cross-section within the body, a rotatable plug fitted into the cavity, a bore in the plug from a first port in one end of the plug to a second port in the curved surface of the plug at a region thereof intermediate the ends of the plug, the curved surface at such intermediate region being progressively recessed from a deepest region about the second port to zero at the portion of the intermediate region diametrically opposite the second port, a first water way in the body from the closure valve to the cavity and registering at its cavity end with the first port of the plug, the cross-section of the water way being less than the cross-section of the cavity, a second water way in the body from the cavity and having a portion extending to the source of hot water, the cavity end of the second water way registering wtih the intermediate curved surface containing the second port, a mixing chamber in the body, a third water way in the body and extending from the cavity to the mixing chamber, the cavity end of the third water way registering with the intermediate curved surface containing the second port, and a fourth water way from the source of hot water into the body and to the mixing chamber, whereby the plug, on being rotated so that the second port registers with the third water way, seals the second water way and passes all the water released on opening the closure valve directly to the mixing chamber through the third water way and on being rotated so that the second port registers with the second water way seals the third water way to pass all the released water through the second water way into the source of hot water, the fourth water way and into the mixing chamber, while at any intermediate position in the range of rotation the plug divides the released water into two portions in accordance with the intermediate position of which one portion flows through the third water way directly to the mixing chamber and the other of which portions flows through the second water way, the source of hot water and the fourth water way into the mixing chamber.

3. A water mixing unit according to claim 2 in which the source of cold water is connected to the rear of the body, the extending portion of the second water way is connected to one lateral side of the body, and the fourth water way is connected to the other lateral side of the body.

4. A water mixing unit according to claim 2 in which each the source of cold water, the extending portion of the second water way, and the fourth water way, is connected to the bottom of the body.

5. A water mixing unit according to claim 2 in which the cavity is frusto-conical in shape, the plug is a truncated cone having the first port centrally of its smaller base and the second port is substantially at the middle region of the cone.

6. A water mixing unit according to claim 2 in which the plug is a truncated cone and the circumferential recess at the second port extends about 200 to 270 degrees circumferentially and progresses uniformly from zero to a deepest intermediate portion at the second port back to zero.

7. A water mixing unit according to claim 2 in which the cavity ends of the second and of the third water ways are on diametrically opposite sides of the mixing plug and in alignment with each other, and the plug is a truncated cone of which the circumferential recess is of a height such that the conical surface of the plug above and below said ends hydraulically seals the second and third water ways, the recess extending from about 200 to 270 degrees circumferentially in the conical surface and progressing uniformly from zero to a deepest intermediate portion at the second port back to zero.

8. A water mixing unit in accordance with claim 1 in which the plug is operable toward increasing temperature of the water obtainable from the unit in the same direction as the closure valve is operable to increase the volume of water obtainable from the unit, and each the plug and valve is provided with a handle, the handles being at a distance from each other readily spanable by the one hand of the user.

9. A water mixing unit according to claim 2 in which the valve is mounted for rotation and is operable from closure to full open and the plug is operable from cold to hot water by a rotary motion in the same direction, and each the valve and the plug is provided with a handle, the handles being closely adjacent each other and vertically aligned.

10. A water mixing unit for obtaining water at various predetermined temperatures within a range, comprising a source of hot water, a source of cold water, a body, an outlet from the body, a first waterway in the body and connected to the source of hot water, a second waterway in the body and connected to the source of cold water, a third waterway in the body and connected to the outlet and to the source of hot water, a cavity having a substantially circular cross section in one direction, the first, second and third waterways opening into the cavity with two of the waterways in substantially diametrical alignment and the other waterway opening thereinto at substantially right angles to the two aligned waterways, a closure valve in at least one of the waterways at a region of the body other than the cavity, and a variably positionable rotatable plug in the cavity, the plug being of a cross-section snugly fitting into the circular section of the cavity and having an axial bore, a radial bore connecting to the axial port and terminating in one port in the cylindrical surface of the plug, the cylindrical surface being circumferentially recessed progressively from a deepest region at the port to zero recessing at from 100 to 130 degrees to each side of the port, the recessed portion being in alignment with said two diametrically aligned waterways and of a width such that the non-recessed portions of the plug cylindrical surface above and below the recessed portion forms hydraulic seals about the two aligned waterways with the surface of the cavity, the axial bore of the plug being aligned with the other of the three waterways.

11. A water mixing unit for obtaining water at a desired temperature comprising a hot water supply, a cold water supply, a body, a mixing chamber within the body, a plurality of water passageways at least in part in the body and individually connecting each water supply to the mixing chamber, openable closure means positioned in the body in the water passageway connecting the cold water supply to the chamber, an outlet waterway from the chamber to a point outside the body, a cavity in the body in the water passageway connecting the cold water supply to the chamber, a return waterway from the cavity to the hot water supply, and a variably positionable dividing means within the cavity adapted on opening of the closure means to divide the released cold water into a first portion in the passageway connecting the cold water supply and the chamber to flow into the chamber and a second portion to flow into the chamber through the return waterway, the hot water supply and the passageway connecting the hot water supply and the chamber, the second portion being selectively of any percentage of the released cold water from zero to one hundred percent.

(References on following page)

References Cited in the file of this patent

UNITED STATES PATENTS

| | | |
|---|---|---|
| 993,806 | Taylor | May 30, 1911 |
| 1,127,822 | Sturtevant | Feb. 9, 1915 |
| 1,383,231 | Nelson | June 28, 1921 |
| 1,529,492 | Marteka | Mar. 10, 1925 |
| 1,830,067 | Mellers et al. | Nov. 3, 1931 |
| 1,855,354 | Kennedy | Apr. 26, 1932 |
| 2,355,687 | Van Hise | Aug. 15, 1944 |

FOREIGN PATENTS

| | | |
|---|---|---|
| 96,554 | Sweden | June 15, 1939 |